US008519267B2

(12) United States Patent
Peters et al.

(10) Patent No.: US 8,519,267 B2
(45) Date of Patent: Aug. 27, 2013

(54) TERMINAL HAVING INTEGRAL OXIDE BREAKER

(75) Inventors: Kenneth J. Peters, St. Augustine, FL (US); William L. Arenburg, St. Augustine, FL (US)

(73) Assignee: Carlisle Interconnect Technologies, Inc., Saint Augustine, FL (US)

(*) Notice: Subject to any disclaimer, the term of this patent is extended or adjusted under 35 U.S.C. 154(b) by 580 days.

(21) Appl. No.: 12/371,765

(22) Filed: Feb. 16, 2009

(65) Prior Publication Data

US 2010/0206631 A1 Aug. 19, 2010

(51) Int. Cl.

| | |
|---|---|
| ***H02G 15/02*** | (2006.01) |
| ***H02G 15/04*** | (2006.01) |
| ***H01R 4/18*** | (2006.01) |
| ***H01B 7/00*** | (2006.01) |

(52) U.S. Cl.
USPC ........ 174/77 R; 174/74 R; 174/79; 174/84 C; 174/122 C

(58) Field of Classification Search
USPC .............. 174/74 R, 76, 77 R, 79, 84 C, 84 R, 174/85, 88 R, 122 C
See application file for complete search history.

(56) References Cited

U.S. PATENT DOCUMENTS

| | | | |
|---|---|---|---|
| 1,156,710 | A | 10/1915 | Rowe |
| D90,584 | S | 8/1933 | Koch |
| 1,970,635 | A | 8/1934 | Szekely |
| 1,989,718 | A | 2/1935 | John |
| 2,379,567 | A | 7/1945 | Buchanan |
| 2,385,792 | A | 10/1945 | Carlson |
| 2,410,321 | A | 10/1946 | Watts |
| 2,480,280 | A | 8/1949 | Bergan |
| 2,551,299 | A | 5/1951 | Sowa |
| 2,554,813 | A | 5/1951 | Buchanan |
| RE23,688 | E | 7/1953 | Watts |
| 2,654,873 | A | 10/1953 | Swengel |
| 2,671,889 | A | 3/1954 | Vickery |
| 2,681,439 | A | 6/1954 | Carlson |
| 2,681,440 | A | 6/1954 | Swengel |
| 2,721,986 | A | 10/1955 | Badeau |
| 2,724,098 | A | 11/1955 | Bergan |

(Continued)

FOREIGN PATENT DOCUMENTS

| | | |
|---|---|---|
| DE | 1465155 | 12/1968 |
| DE | 9215578 | 12/1992 |
| DE | 19821630 | 9/1999 |
| EP | 1965464 | 9/2008 |

OTHER PUBLICATIONS

Seven-page Partial International Search dated Apr. 8, 2010 for PCT Application No. PCT/US2010/024216.

(Continued)

*Primary Examiner* — Timothy Thompson
*Assistant Examiner* — Sherman Ng
(74) *Attorney, Agent, or Firm* — Wood, Herron & Evans, LLP

(57) ABSTRACT

A one piece integral electrical terminal has a mount portion and a wire receiving portion. The wire receiving portion has a continuous annular interior wall having a contact portion with an integral oxide breaker especially suited to breaking through the oxide layer on aluminum wire. The wire receiving portion also has a sealing portion with at least one integral seal ring. An electrical cable is made by crimping the electrical terminal to an aluminum wire using a modified hexagonal crimp.

36 Claims, 8 Drawing Sheets

(56) References Cited

U.S. PATENT DOCUMENTS 2,735,997 A 2/1956 Peterson
2,769,965 A 11/1956 Nelson
2,795,769 A 6/1957 Wells
2,802,257 A 8/1957 Holtzapple
2,806,214 A 9/1957 Forney, Jr.
2,806,215 A 9/1957 Redslob
2,807,792 A 9/1957 O'Keefe
2,815,497 A 12/1957 Redslob
2,855,581 A 10/1958 Freedom
D185,743 S 7/1959 Edwards
D188,105 S 6/1960 Cobaugh
2,957,226 A 10/1960 Bern
3,098,688 A 7/1963 Martin
3,123,663 A 3/1964 Muldoon
3,356,987 A 12/1967 Francis
3,496,626 A 2/1970 Ullman
3,512,123 A 5/1970 Costello
3,549,786 A 12/1970 Kuo
3,573,721 A 4/1971 Masino et al.
3,594,713 A 7/1971 Thoman
3,633,153 A * 1/1972 Ahmed ......................... 439/424
3,695,642 A * 10/1972 DeWoody .................. 285/148.3
3,717,839 A * 2/1973 Aldridge ....................... 439/431
3,728,665 A 4/1973 Frey
3,732,718 A * 5/1973 Barberio et al. ........... 72/409.16
3,735,331 A 5/1973 O'Donnell et al.
3,757,031 A * 9/1973 Izraeli ........................ 174/138 F
3,763,555 A 10/1973 Van
D230,025 S 1/1974 Hoffman
3,812,448 A 5/1974 Haitmanek
3,828,298 A 8/1974 Schumacher
3,831,132 A * 8/1974 Bowden et al. ............... 439/442
D233,438 S 10/1974 Bruner
3,895,851 A 7/1975 Bolton et al.
3,931,726 A 1/1976 Grubb
3,955,044 A * 5/1976 Hoffman et al. ............ 174/84 C
4,031,613 A 6/1977 Brown
4,114,253 A 9/1978 Loomis et al.
4,139,937 A 2/1979 L'Homme
4,142,771 A 3/1979 Barnes et al.
4,210,379 A 7/1980 Vachhani et al.
4,426,772 A 1/1984 Collier
4,478,479 A 10/1984 Cherry
4,557,048 A 12/1985 Cordeiro
4,604,890 A 8/1986 Martin
4,605,279 A 8/1986 Mixon
4,648,673 A 3/1987 Endo et al.
4,679,888 A 7/1987 Williams
4,684,191 A 8/1987 Feher et al.
4,693,688 A 9/1987 Cembruch
4,754,536 A 7/1988 Goyert et al.
4,795,380 A 1/1989 Frantz
4,813,893 A 3/1989 Sindlinger
4,821,383 A 4/1989 Grosklos
4,828,351 A 5/1989 Beinhaur
4,828,516 A * 5/1989 Shaffer ......................... 439/877
4,845,589 A 7/1989 Weidler
4,861,290 A * 8/1989 Halmstad et al. ............. 439/810
4,902,253 A 2/1990 Schacht
4,959,988 A 10/1990 Dassance
4,979,291 A 12/1990 Phillips
4,983,133 A 1/1991 Van Scyoc
4,998,895 A 3/1991 Forney et al.
5,095,599 A 3/1992 Gloe et al.
5,127,255 A 7/1992 Skotek
5,174,022 A 12/1992 Phillips
5,175,925 A 1/1993 Grosklos
5,188,544 A 2/1993 Mukai
5,188,545 A 2/1993 Hass et al.
5,203,724 A 4/1993 Casey
5,288,245 A 2/1994 Piana
5,418,331 A 5/1995 Delalle
5,422,438 A * 6/1995 Lamome ..................... 174/84 C
5,499,934 A * 3/1996 Jacobsen et al. .............. 439/585
5,514,836 A * 5/1996 Delalle et al. ................... 174/87
5,745,982 A 5/1998 Klinedinst
6,152,784 A 11/2000 Pyles
6,415,499 B1 * 7/2002 Holland et al. .............. 29/564.4
6,558,208 B2 5/2003 Suzuki
6,658,725 B1 * 12/2003 Liu ................................. 29/753
6,666,732 B1 12/2003 Endacott
6,670,555 B2 12/2003 Ota et al.
6,726,510 B2 4/2004 Norbert
6,881,104 B2 4/2005 Suzuki et al.
6,883,229 B2 4/2005 Schuppert, Jr.
6,893,301 B2 5/2005 Kuwayama et al.
6,945,819 B2 9/2005 Laub et al.
7,081,589 B1 7/2006 Advey et al.
7,168,159 B2 1/2007 Imai
7,210,958 B1 * 5/2007 Jacques et al. ................ 439/421
7,264,503 B2 * 9/2007 Montena ....................... 439/587
7,285,011 B2 10/2007 Hardy et al.
7,370,408 B2 5/2008 Deming et al.
2007/0264873 A1 * 11/2007 Kakuta ......................... 439/585
2008/0217055 A1 * 9/2008 Gumley ...................... 174/84 C
2008/0307934 A1 * 12/2008 Coe ................................ 81/426

OTHER PUBLICATIONS

Five-page International Search Report dated Jun. 7, 2010 for PCT Application No. PCT/US2010/024216.

* cited by examiner

TERMINAL HAVING INTEGRAL OXIDE BREAKER

FIELD OF THE INVENTION

This present invention relates generally to electrical connectors, and particularly to improving the performance, construction and ease of use of connectors on aluminum wire.

BACKGROUND OF THE INVENTION

Electrical wires are most often made with copper or aluminum conductors. These may be of one solid piece, or stranded. For ease of connections, for instance to grounding studs, or power strips, a lug or terminal is often attached to the end of the wire. The terms lug, terminal lug, and terminal will be used interchangeably in this application. A wire with a terminal, will be termed a "cable" in this application. The cable, including the interface between the terminal and the conductor, must efficiently conduct the electricity that the cable is meant to carry. If the conductance at the interface is not efficient (if resistance is high), the cable may not perform the function for which it is intended, or it may overheat. Usually, the terminal mechanically fastens to the aluminum or copper conductor. If there is insulation on the wire, it is first removed or penetrated in an area sufficient to allow proper electrical contact which is usually metal-to-metal contact. Sometimes attachment occurs with a heat process such as welding or soldering, however these tend to be slower methods than mechanical fastening. Also, the heat of these processes could deteriorate the properties of the nearby insulation that is on the conductor. Mechanical crimping of a terminal around a wire is commonly used. However, the chemistry of aluminum oxidation makes crimping to an aluminum wire more difficult than to a copper wire, as will be explained.

It is known that aluminum resists corrosion (oxidation) better than steel does. For example, lawn furniture made of steel develops flaking rust (oxidation) but aluminum furniture does not. Aluminum also oxidizes almost instantaneously when exposed to air, but the oxide does not subsequently flake off. Instead, the oxidized surface layer is very thin and very strong. It protects the nonoxidized aluminum below by separating it from the surrounding air. This property of aluminum presents a problem in the manufacture of aluminum cables because the oxide layer is a poor conductor of electricity. Thus, one consideration in aluminum cable manufacture is how to get good electrical conductivity between a terminal and an aluminum wire. Preferably, good electrical conductivity is achieved in a cost effective manner that has a low opportunity for problems to arise during the manufacturing process.

Another consideration in cable manufacture is how to create a cable that resists moisture and air infiltration between the terminal and the conductor. In many cases this means making an airtight connection between the terminal and the exterior of the wire insulation.

Still another consideration in cable manufacture is how to provide a terminal/cable combination that has a consistent and strong geometry. Preferably the terminal and cable are straight and smooth to avoid stress concentrations. With stranded wire, severing one or more strands during the terminal attachment process should also be avoided.

There have been many attempts at making a terminal for use with Aluminum wire. For example, U.S. Pat. No. 3,955,044 to Hoffman et al., issued May 4, 1976 shows one such prior art. FIGS. 1-3 in the present application are representative of a prior art configuration showing some drawbacks to the prior art. A tin plated copper terminal 10 includes a ring tongue (RT) style connector portion 11, a cylindrical wire barrel 12, a perforated liner 14, and an annular ring 16 with an inclined wall 18. Terminal 10 is shown in exploded view with stranded aluminum wire 20 having conductor strands 22, an insulating sheath 24, and an abrasion sheath 26. FIGS. 2 and 3 show the wire 20 installed in the terminal 10, before and after crimping by die set 27. In FIG. 3, the deformation, known as terminal skew, of the terminal 10 is extensive, with the upper mounting surface 28 and lower mounting surface 30 no longer parallel to the axis 32 of the wire 20. Also, with such a design several conductor strands 22 might be severed as shown at 34 in the area of annular ring 16. The pre-crimp geometry of FIG. 2 is represented with phantom lines in FIG. 3. The extensive extrusion and crimping of the conductor strands 22 and barrel 12 changes the length 36 and the angle 38 an amount that is significant and not precisely predictable.

There are many drawbacks to the prior art, including, but not limited to the multiple pieces that are required and that lead to increased cost and opportunity for assembly errors, severing of one or more strands, and the non-linear alignment between the connector portion and the wire barrel after crimping. The present invention addresses these drawbacks and other drawbacks in the prior art.

SUMMARY OF THE INVENTION

An integral electrical terminal for use with aluminum wire has a mount portion for connecting to a part of an electric circuit and a wire receiving portion. The wire receiving portion has a continuous annular interior with a contact portion that has an integral oxide breaker. The receiving portion may also have a sealing portion that has at least one integral seal ring for sealing with the insulator on the wire.

The integral oxide breaker may have tapered protrusions with a coating. In one embodiment the coating is nickel, and the protrusions are a helical thread. The receiving portion accepts an aluminum wire to make a cable, and upon crimping of the receiving portion the oxide breaker makes electrical contact with the wire.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 4:
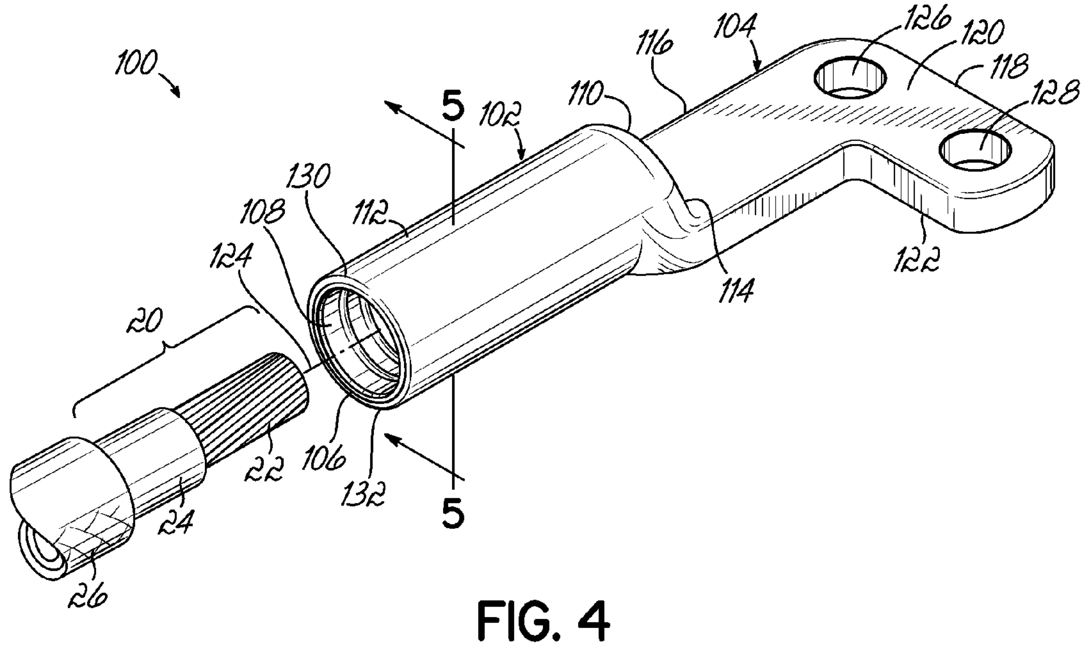
FIG. 4 illustrates an embodiment of the current invention with a stranded wire prior to installation.

With reference to FIG. 4, an integral electrical terminal 100, made from a solid piece of 1100 Aluminum per ASTM B221, has a wire receiving portion 102 and a mount portion 104, and is shown with a stranded aluminum wire 20 having conductor strands 22, an insulating sheath 24. In one embodiment, the terminal may include an abrasion sheath 26. The receiving portion 102 has a front face 106 surrounding an aperture 108, a back face 110, and an outer wall 112 between the front face 106 and the back face 110. The receiving portion 102 is cylindrical, consistent with the usual cylindrical shape of wire, although the receiving portion 102 may be a variety of shapes. Between the back face 110 and the mount portion 104 is a transition radius 114. The mount portion has a parallel leg 116 and a perpendicular leg 118 coming from the end of the parallel leg 116 opposite the receiving portion 102. This terminal 100 is in the shape of what is known in the industry as a CRN terminal, however the mount portion 104 may be a variety of shapes. If the mount portion 104 had only the parallel leg 116, it would be an RT (Ring Tongue) configuration. A top face 120 and a bottom face 122 are approximately parallel to an axis 124 of the receiving portion 102. Hole 126 and a second hole 128 pass through the mount portion 104 from the top face 120 to the bottom face 122. The receiving portion 102 has a top 130 and a bottom 132, as determined by the orientation of the top face 120 and bottom face 122.

Figure 5:
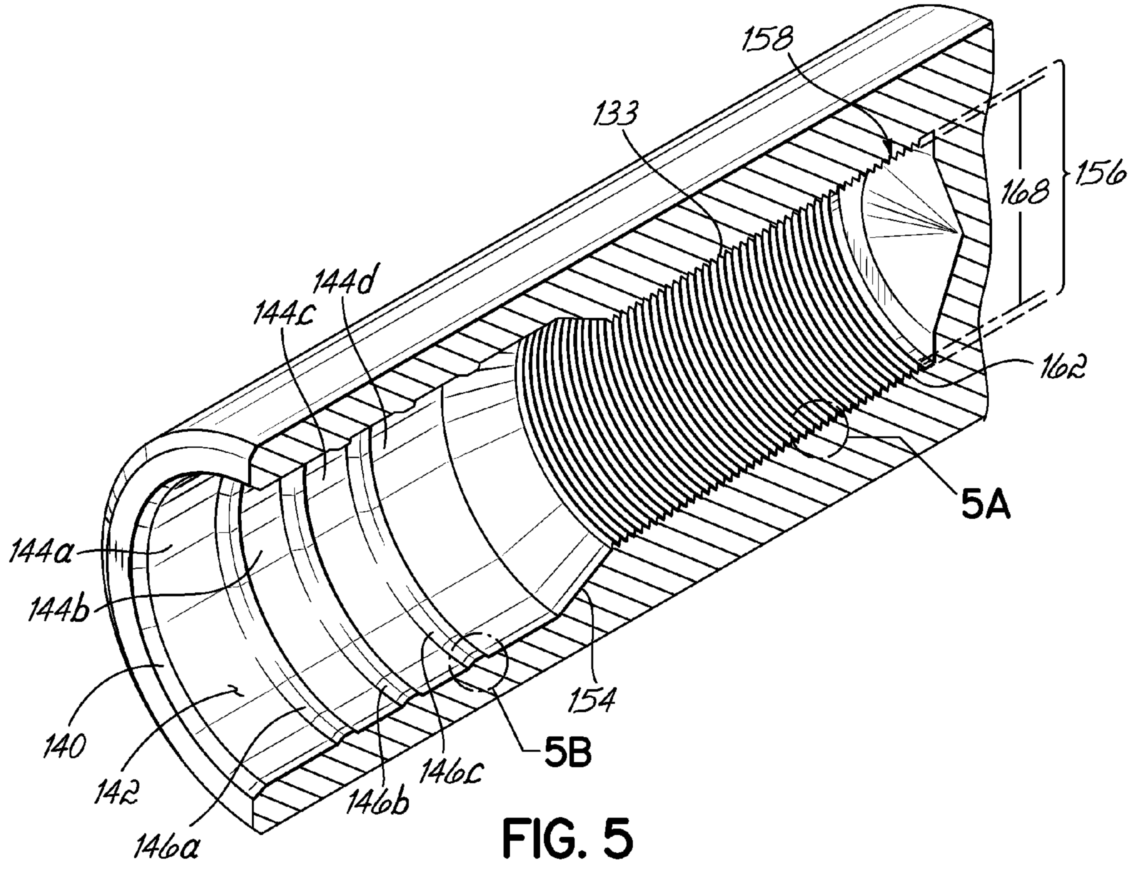
FIG. 5 is a partial cross-section as indicated in FIG. 4.
Figure 5A:
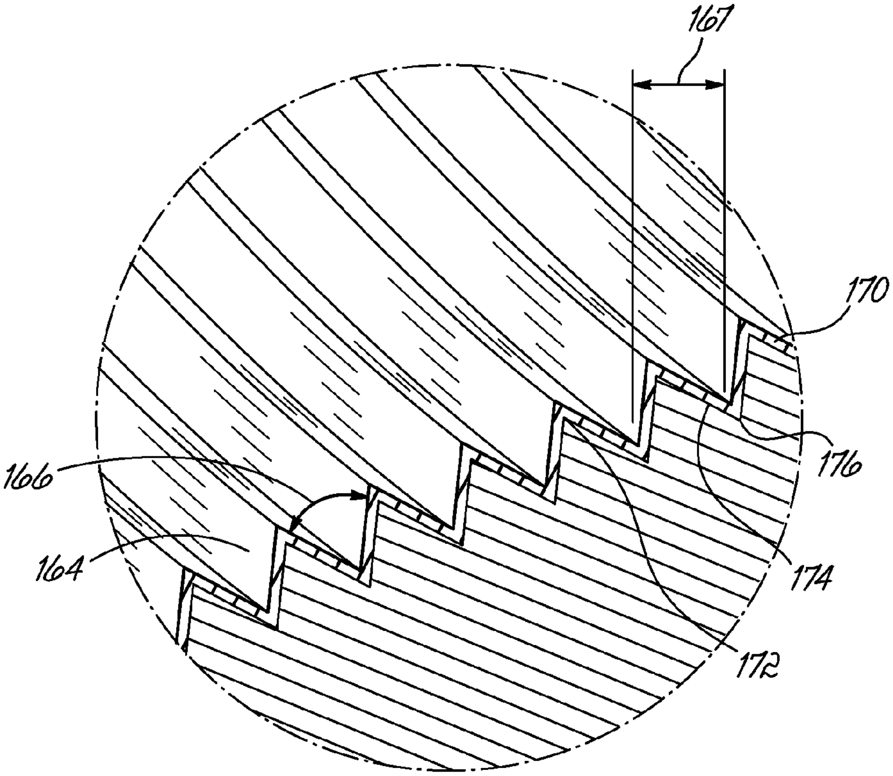
FIG. 5A is a detail view as indicated in FIG. 5.
Figure 5B:
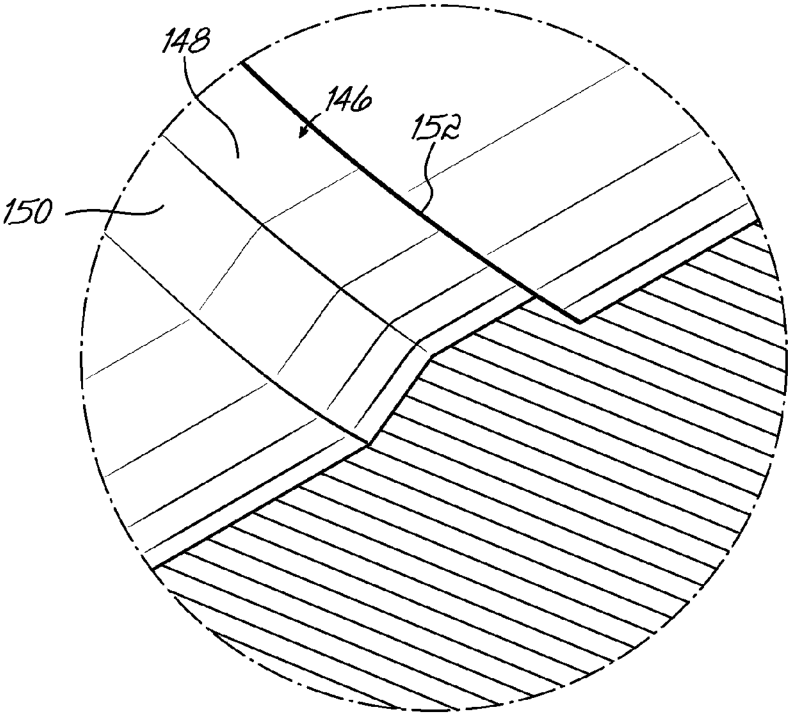
FIG. 5B is a detail view as indicated in FIG. 5.
Figure 8:
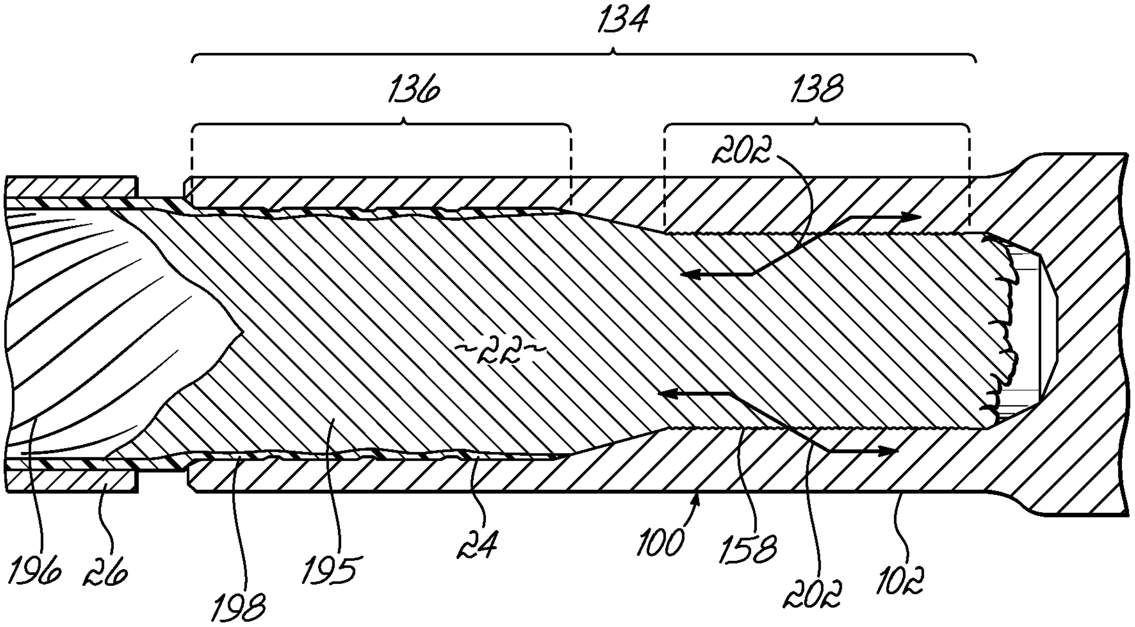
FIG. 8 is a cross-section as indicated in FIG. 7.
Figure 9:
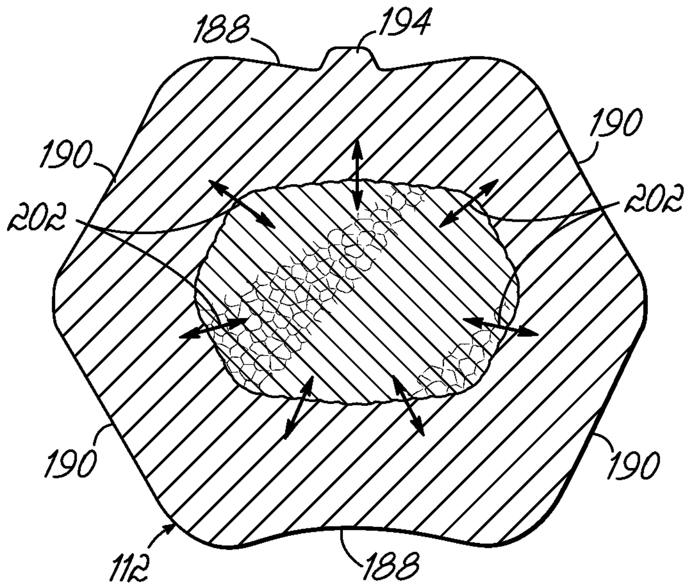
FIG. 9 is a cross-section as indicated in FIG. 7.

With reference to FIGS. 4, 5, and 8, the receiving portion 102 has continuous annular interior wall 133 comprising a crimp portion 134 (FIG. 8) that comprises a seal portion 136 and a contact portion 138. A chamfer or radius 140 at the front face 106 connects with a seal zone surface 142. The seal zone surface 142 is broken into four areas 144*a, b, c, d* by three integral seal rings 146*a, b, c* protruding radially inward from the seal zone surface 142. In this embodiment the four areas 144*a, b, c, d* all measure substantially the same diameter, however in other embodiments the diameters may be different. Similarly, the seal rings 146*a, b, c*, having a smaller diameter than the diameter of the four areas 144*a, b, c, d*, all measure substantially the same diameter, however in other embodiments the diameters may be different. It is also contemplated that there may be more than or fewer than the three illustrated seal rings. Each seal ring 146 has a face 148 (FIG. 5B) of a particular width, with a front angled wall 150 and a back angled wall 152 leading to the adjacent one of the four areas 144. In this embodiment, all the angled walls 150, 152 are the same angle, however, in other embodiments the angles may be different, or may be a positive or a negative radius.

An integral funnel 154 is between the seal portion 136 and the contact portion 138. The integral funnel 154 guides the conductor strands 22 from the larger seal portion 136 into the contact portion 138, while the wire 20 is being inserted into the terminal 100.

The contact portion 138 has a continuous cylindrical wall 155 with a major diameter 156 and an integral oxide breaker 158, the term this application will use for the macro object that breaks through the oxide layer on the aluminum conductor strands 22.

The integral oxide breaker 158 comprises a plurality of tapered protrusions 162 extending radially inward from the major diameter 156 of the contact portion 138. These tapered protrusions 162 may be separate from each other, but in the embodiment shown, for ease of manufacture, these tapered protrusions 162 are in the form of a helical thread 164 (FIG. 5A) that is conveniently manufactured on metal cutting or forming equipment. In one embodiment the thread 164 has a sixty degree included angle 166 and a pitch 167 of eighty, and is 0.008/0.010 inch deep. A pitch 167 of sixty has also worked successfully. It is contemplated that other included angles 166 and pitch 167 combinations as well as depths would also work. A minor diameter 168 of the threads equal to 0.481±0.002 inch has been used for wire gauge 2/0. The oxide breaker 158 further comprises a coating 170 on the protrusions 162. In this embodiment the coating 170 is an electroless nickel plate of 0.0005±0.002 per ASTM B733 Type III. This may be successfully put in the blind hole (blind refers to a hole with only one aperture 108) by using an appropriate coating process. In addition to nickel, other coatings that have been contemplated but not tried are electro nickel, gold, silver, tin and tin-lead, and alkaline-bismouth-tin.

Figure 10:
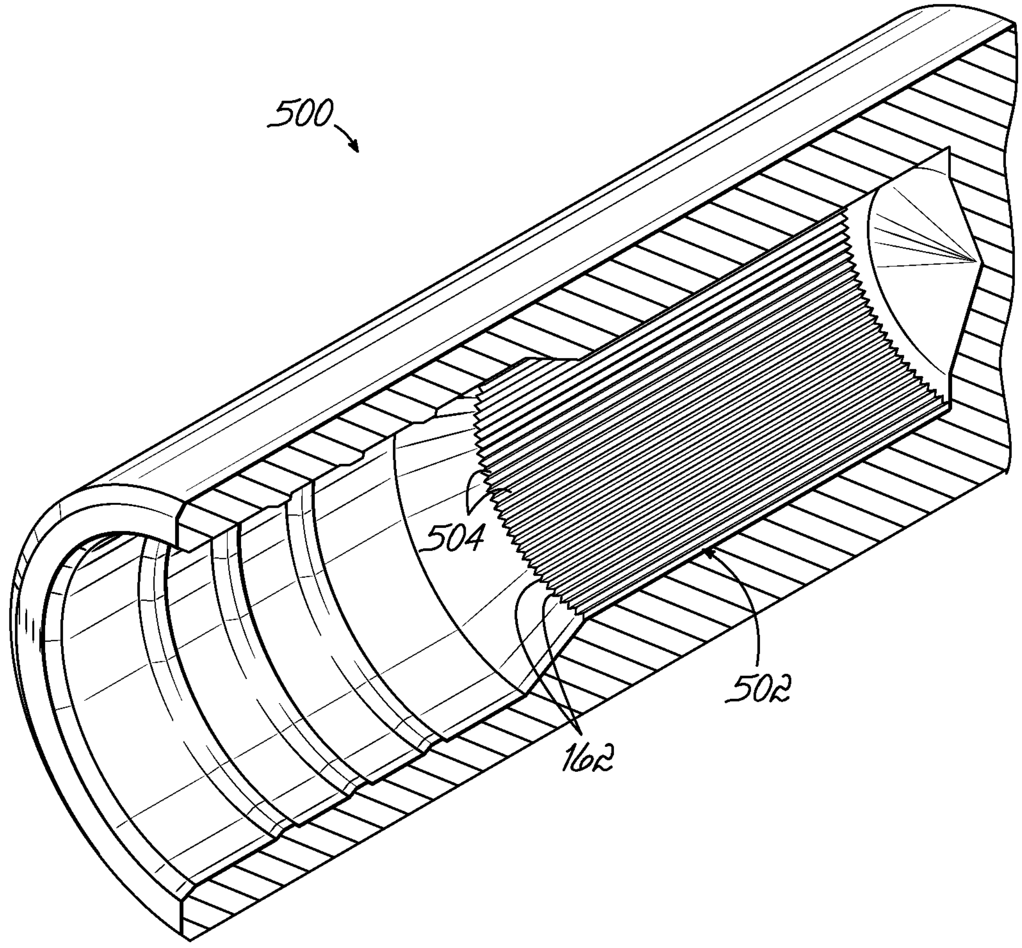
FIG. 10 is a partial cross-section illustrating a second embodiment of the current invention.

It is also contemplated that other forms of oxide breakers, for example discrete annular protrusions, would also work, however the making of one spiral thread is a widely perfected and efficient process. FIG. 10 illustrates a contemplated terminal 500 in which the protrusions 162 of the oxide breaker 502 are axial ridges 504. The orientation of the axial ridges 504, being parallel to the direction of pull-out, illustrates that the protrusions 162 are for conductance purposes, and not related to meeting minimum pull-out requirements. In both embodiments 100, 500, these protrusions 162 comprise peaks 172, angular faces 174, and bottoms 176, covered by coating 170 as seen in detail FIG. 5*a*. Other embodiments of protrusions 162 are contemplated but not shown, for example, a plurality of spikes rising from the major diameter 156.

Figure 1:
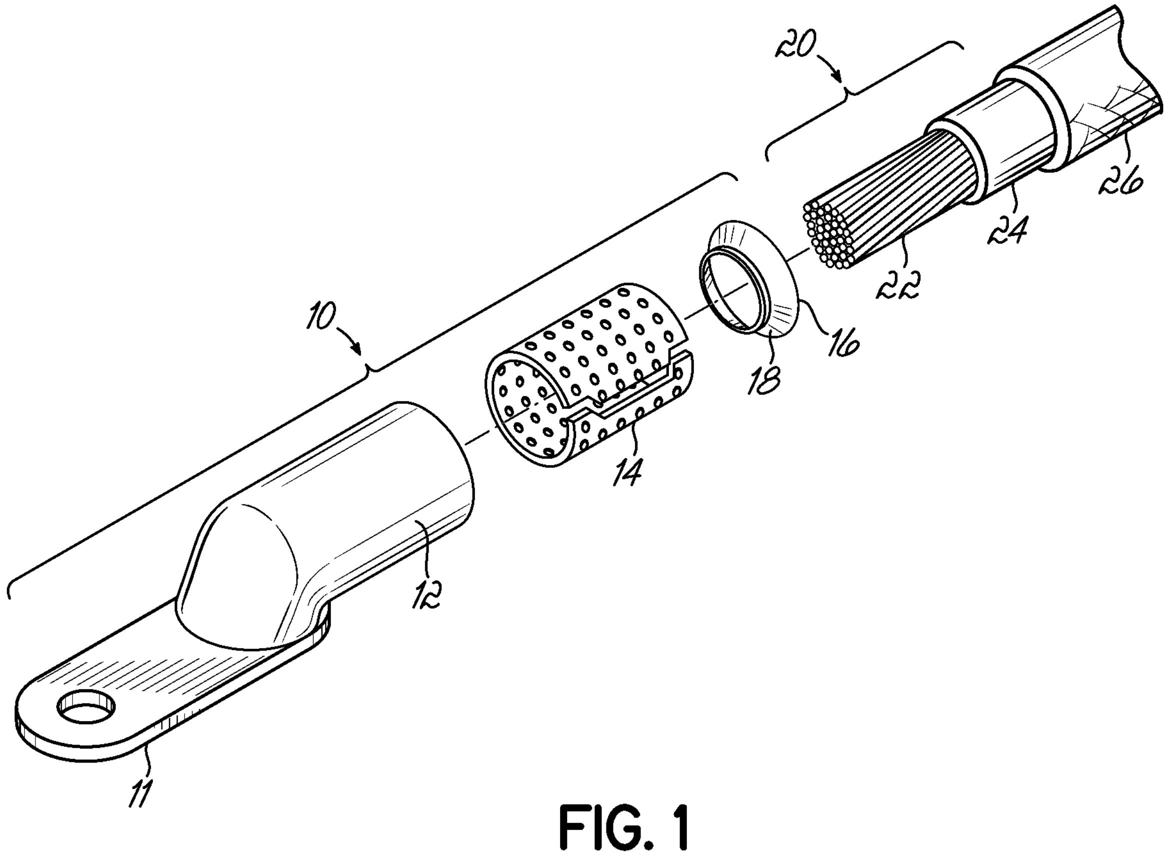
FIG. 1 PRIOR ART
FIG. 1 is an exploded view of a terminal of the prior art, with a wire.
Figure 2:
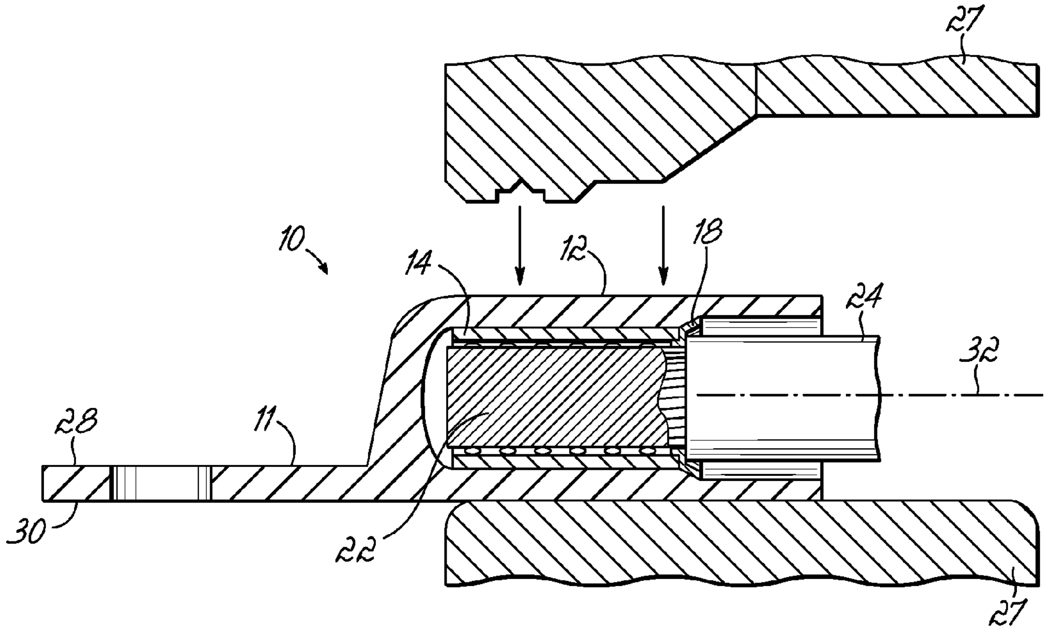
FIG. 2 PRIOR ART
FIG. 2 is an assembled view of FIG. 1 prior to crimping, and is also prior art.
Figure 3:
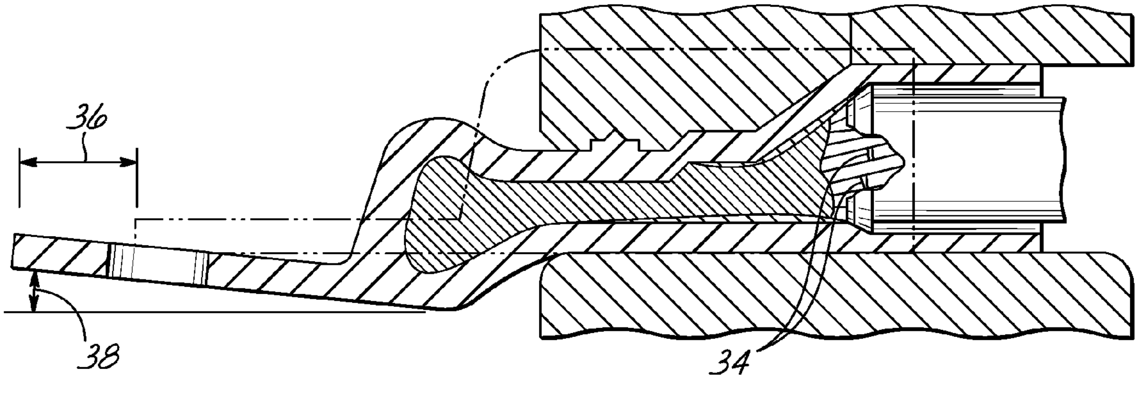
FIG. 3 PRIOR ART
FIG. 3 is an assembled view of FIG. 1 after crimping, and is also prior art.
Figure 6:
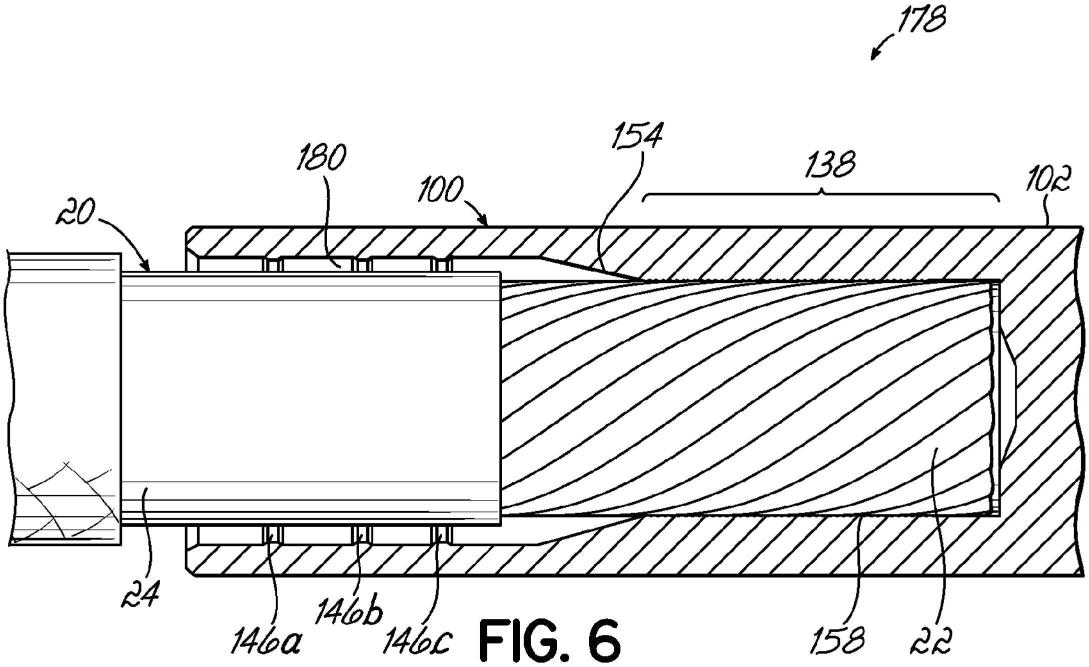
FIG. 6 illustrates a not cross-sectioned wire slid into a cross-sectioned embodiment of FIG. 4 for illustrative purposes.

In use to make an assembly 178 (FIG. 6), the wire 20 is inserted in the terminal so that the conductor strands 22 are guided by the integral funnel 154 into the contact portion 138. The three seal rings 146*a,b,c* surround the insulation sheath 24, and the integral oxide breaker 158 surrounds the conductor strands 22. There is a clearance space 180 between the terminal 100 and the wire 20. Assembly only requires the electrical terminal and the wire, thus it is far easier than stocking, handling, and properly orienting multiple pieces as shown in FIG. 1. There is not a concern that an internal piece may be left out, installed backwards, or installed incorrectly. Costs are reduced for at least component manufacturing and stocking, and for assembly.

Figure 7:
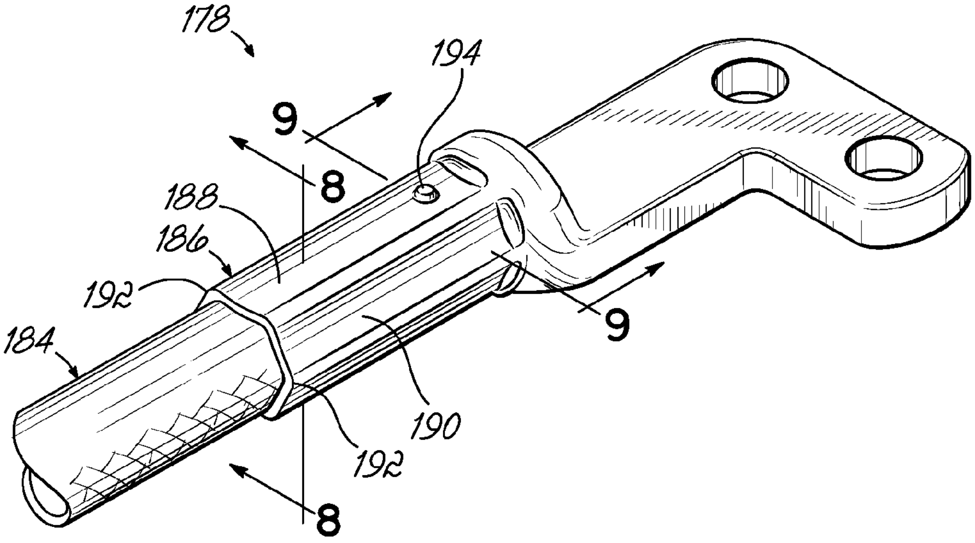
FIG. 7 illustrates an assembled and crimped embodiment of FIG. 4.
Figure 11:
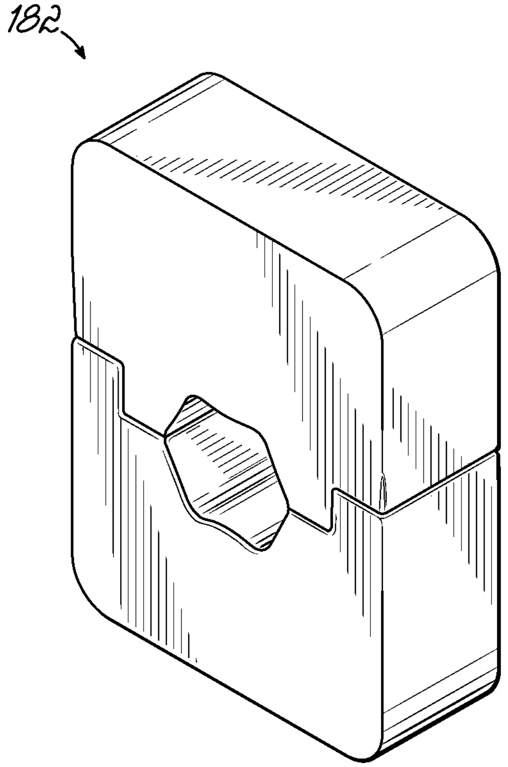
FIG. 11 is a perspective view of a die set used for crimping.

The assembly 178 is placed in a modified hex crimping die 182 (FIG. 11) and crimped to make a cable 184 with a crimp 186. (FIG. 7). The crimp 186 comprises 2 opposing concave facets 188 and four straight facets 190. Between the facets are six corners 192. On one of the concave facets 188 is an indicator button 194. The indicator button 194 will be properly formed if the wire 20 was properly inserted and crimped. If the wire 20 was improperly inserted or crimped the indicator button 194 will be shaped improperly, indicating to a person or a visual inspection system that the particular cable 184 should be rejected. The indicator button 194 is formed by a recess (not shown) in crimping die 182. If the conductor strands 22 are not present in the proper position in the terminal 100, the receiving portion 102 will not extrude into the recess, and the indicator button 194 will not be formed.

Internally, as illustrated in FIG. 8, the conductor strands 20 are squeezed together tightly at 195 as compared to the visibly individual strands at 196 outside of the terminal 100. The sealing rings 146*a,b,c* are squeezed into the insulating sheath 24 to make a hydrostatic seal 198. The integral oxide breaker 158 is squeezed into the aluminum conductor strands 22 to give the assembly 178 a conductive electrical path 202 between the receiving portion 102 and the stranded aluminum wire 20.

Magnified examinations of sectioned cables 184 showed scrubbing action as the oxide breaker 158 penetrated the outside conductor strands 22 about 40% of their individual diameters. The protrusions 162 were seen to be buckled by compression, further increasing the scrubbing action that breaks the oxide.

Testing was conducted to verify the performance of the terminal with the integral oxide breaker 158 as follows:

Oxide Breaker testing: A smooth bore design was compared with a machined oxide breaker by testing. Results showed that the smooth bore did not meet the low initial 6.0 millivolt requirement whereas the machined oxide breaker barrel met the requirement with very good margin. Further testing after Thermal Shock and Current Cycling proved that the machined oxide breaker feature continued to perform well.

Thermal Shock testing: After the initial millivolt drop testing, a modified 100 cycle Thermal Shock test was run on the same set of 2/0 AWG Single-Hole Tensolite Aluminum Terminal samples. The temperature was cycled between −65° C. and +175° C. but no current flow was included in the testing. Millivolt drop results were tested at the end of the 100 cycles. The millivolt results after 100 cycles show that the terminals met the millivolt requirement of BPS-T-217 and the more stringent millivolt requirement of BPS-T-233.

Current Cycling testing: After Thermal Shock, a Current Cycling test was run on the same 2/0 AWG samples. A BPS-T-233 test method was used to evaluate the performance of the Tensolite 2/0 AWG single-hole terminals. Two assemblies were mounted in series with each of the four terminals attached to 7054-T4751 aluminum plates. Temperature verses current results showed all samples passed the 160 F. degrees maximum and MV maximum drop.

Hydrostatic seal testing: The hydrostatic test used aluminum terminals crimped to wire and installed into a water filled chamber. The chamber was cycled 25 times from 0 to 80 PSI and held at pressure for 15 minutes each cycle. All samples passed.

Mechanical Strength of Crimp testing: All samples exceeded the 825-850 lb-Force target. The samples failed at the conductor and not in the crimp zone. Samples had previously gone through Thermal Shock and Current Cycling testing.

Consistent and Repeatable Length testing: Crimping of the 2/0 samples resulted in a consistent 0.10 inch length growth verses 0.25 to 0.38 inches for the bath tub crimp of the prior art.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An integral electrical terminal comprising:

a mount portion and a wire receiving portion formed of an electrically conductive material;

a wire receiving portion having an aperture and including a continuous annular interior wall that forms a crimp portion to be crimped around a wire, the crimp portion including a continuous contact portion with an integral oxide breaker and a continuous sealing portion that is spaced from the contact portion toward the aperture;

the integral oxide breaker including a plurality of tapered protrusions extending radially inward in the contact portion, the protrusions having a coating thereon of a material different from the electrically conductive material of the wire receiving portion and configured to engage a wire positioned in the contact portion when the crimp portion is crimped;

the sealing portion including at least one continuous and integral seal ring.

2. The integral electrical terminal of claim 1 wherein the plurality of tapered protrusions extend from the continuous annular interior wall and small ends of the tapered protrusions point toward a center axis of the wire receiving portion.

3. The integral electrical terminal of claim 1 wherein the plurality of tapered protrusions are axial ridges having a longitudinal axis parallel to the center axis of the wire receiving portion.

4. The integral electrical terminal of claim 1 wherein the coating is a nickel material coating.

5. The integral electrical terminal of claim 1 wherein the integral oxide breaker comprises a coated helical thread.

6. The integral electrical terminal of claim 1 wherein the integral oxide breaker comprises a nickel coated helical thread.

7. The integral electrical terminal of claim 1 wherein the sealing portion includes a plurality of continuous and integral seal rings.

8. The integral electrical terminal of claim 1 wherein the electrically conductive material is predominantly aluminum.

9. The integral electrical terminal of claim 1 wherein the crimp portion is adapted to be crimped to an aluminum wire by a hexagonal shaped crimping die.

10. The integral electrical terminal of claim 9 wherein the hexagonal shaped crimping die forms a crimp with two opposing concave surfaces and four straight surfaces.

11. A wire receiving portion of an electrical terminal formed of an electrically conductive material comprising:

a continuous annular interior wall forming a continuous contact portion and an adjacent continuous and integral sealing portion and configured to receive a wire through an aperture;

a plurality of integral tapered protrusions extending from a surface of the interior wall at the continuous contact portion, the integral tapered protrusions configured to be adjacent an aluminum wire before crimping of the electrical terminal, and in tight contact with the aluminum wire after crimping of the electrical terminal;

a coating on the integral tapered protrusions, the coating formed of a material different from the electrically conductive material; and the adjacent continuous and integral sealing portion spaced from the integral tapered protrusions along the interior wall toward the aperture, the sealing portion including at least one continuous and integral seal ring that crimps tightly to an insulating sheath of the aluminum wire after crimping of the electrical terminal.

12. The wire receiving portion of claim 11 wherein the integral tapered protrusions include axial ridges having a longitudinal axis parallel to a center axis of the wire receiving portion.

13. The wire receiving portion of claim 11 wherein the coating is a nickel coating.

14. The wire receiving portion of claim 11 wherein the integral tapered protrusions include a coated helical thread.

15. The wire receiving portion of claim 11 wherein the integral tapered protrusions include a nickel coated helical thread.

16. The wire receiving portion of claim 11 wherein the adjacent continuous and integral sealing portion includes a plurality of continuous and integral seal rings.

17. The wire receiving portion of claim 11 wherein the electrically conductive material is predominately aluminum.

18. The wire receiving portion of claim 11 wherein the wire receiving portion is adapted to be crimped to the aluminum wire by a hexagonal shaped crimping die.

19. The wire receiving portion of claim 18 wherein the hexagonal shaped crimping die forms a crimp with two opposing concave surfaces and four straight surfaces.

20. A cable comprising:

an aluminum electrical wire having a conductor with an oxide layer and insulation;

an electrical terminal formed of an electrically conductive material having an aperture and a crimp portion with a continuous annular wall that receives an end of aluminum electrical wire, the electrical terminal crimp portion being crimped to the aluminum electrical wire;

an oxide breaker integral to the continuous annular wall of the crimp portion of the aluminum electrical terminal and comprising at least one integral protrusion with a nickel coating, the nickel coating on the integral protrusion configured to penetrate the oxide layer of the conductor to make an electrical path with the aluminum electrical wire when the aluminum electrical terminal is crimped to the aluminum electrical wire; and at least one continuous and integral seal ring that is integral to the continuous annular wall of the crimp portion and spaced from the oxide breaker toward the aperture of the electrical terminal, the continuous and integral seal ring sealing an end of the electrical terminal with the insulation when the electrical terminal is crimped.

21. The cable of claim 20 wherein the electrical terminal is crimped with a hexagonal crimp having at least two opposing facets with a concave curve oriented toward a center axis of the electrical terminal.

22. The cable of claim 20 wherein the integral protrusion includes at least one axial ridge having a longitudinal axis parallel to a center axis of the electrical terminal.

23. The cable of claim 20 wherein the integral protrusion includes a coated helical thread.

24. The integral electrical terminal of claim 1 further comprising a funnel positioned between the continuous contact portion and the continuous seal portion.

25. The integral electrical terminal of claim 7 wherein the continuous and integral seal rings have the same diameter.

26. The integral electrical terminal of claim 7 wherein the continuous and integral seal rings have different diameters.

27. The integral electrical terminal of claim 1 wherein the continuous and integral seal ring has a face and at least one angled wall that is angled from the face.

28. The wire receiving portion of claim 11 further comprising a funnel positioned between the integral tapered protrusions and the continuous and integral sealing portion.

29. The wire receiving portion of claim 16 wherein the continuous and integral seal rings have the same diameter.

30. The wire receiving portion of claim 16 wherein the continuous and integral seal rings have different diameters.

31. The wire receiving portion of claim 11 wherein the continuous and integral seal ring has a face and at least one angled wall that is angled from the face.

32. The cable of claim 20 further comprising a funnel positioned between the oxide breaker and the seal ring.

33. The cable of claim 20 further comprising a plurality of continuous and integral seal rings.

34. The cable of claim 33 wherein the continuous and integral seal rings have the same diameter.

35. The cable of claim 33 wherein the continuous and integral seal rings have different diameters.

36. The cable of claim 20 wherein the continuous and integral seal ring has a face and at least one angled wall that is angled from the face.

* * * * *